United States Patent [19]

Turner, Jr.

[11] Patent Number: 4,655,294
[45] Date of Patent: Apr. 7, 1987

[54] KIT FOR EXTINGUISHING CHARCOAL FIRES

[76] Inventor: O'Neal Turner, Jr., 5200 W. Montgomery Ave., Apt. 2B, Philadelphia, Pa. 19131

[21] Appl. No.: 700,390

[22] Filed: Feb. 11, 1985

[51] Int. Cl.$^4$ ........................ A62C 1/00; A62C 21/00
[52] U.S. Cl. .................... 169/46; 126/25 C; 169/65
[58] Field of Search .......... 169/43, 46, 65, 91, 169/54; 126/25 C; 140/3 R; 245/1, 8, 9; 220/19, 404

[56] References Cited

U.S. PATENT DOCUMENTS

| | | |
|---|---|---|
| 312,965 | 2/1885 | Bullivant ........................ 43/7 X |
| 2,318,164 | 5/1943 | Kellems ........................ 220/19 X |
| 3,060,919 | 10/1962 | Shaw . |
| 3,318,300 | 5/1967 | Witty . |
| 3,370,582 | 2/1968 | Rauh . |
| 3,382,863 | 5/1968 | Katz ........................ 126/25 C |
| 3,394,693 | 7/1968 | Robinson . |
| 3,509,814 | 5/1970 | Karapetian . |
| 3,575,156 | 4/1971 | Hosford . |
| 3,610,225 | 3/1970 | Schwantes . |
| 3,940,052 | 2/1976 | McHugh ........................ 220/404 |
| 4,254,863 | 3/1981 | Kates . |
| 4,347,948 | 9/1982 | Hamada et al. ........................ 220/404 |

Primary Examiner—Jeffrey V. Nase
Attorney, Agent, or Firm—William H. Eilberg

[57] ABSTRACT

A kit is disclosed which provides a novel way of extinguishing charcoal fires. The kit includes a flexible metal net, the net being of sufficient thickness and mesh size to hold burning charcoal briquets. The net has at least two handles along its periphery. The kit also includes a water resistant bag, and may also include a rigid container for supporting the bag in an upright position. When a charcoal fire is to be extinguished, the net is laid on the ground, and the charcoal briquets are dumped onto the net. The net is then raised, by its handles, so as to lift the pile of briquets from the ground. The net is immersed in the bag, the bag having been filled with water. After the briquets are extinguished, all but one of the handles of the net are released, and the charcoal briquets are allowed to fall into the bag. The open end of the bag may then be tied, and the bag can be easily discarded. The method described is neat and economical, and the kit can be used more than once.

6 Claims, 8 Drawing Figures

KIT FOR EXTINGUISHING CHARCOAL FIRES

BACKGROUND OF THE INVENTION

The present invention relates to the field of outdoor cooking, specifically barbecue fires which use charcoal, or similar fuel materials, as a source of heat. The invention comprises a kit for extinguishing such fires, and a method for its use.

Food which is cooked over an outdoor charcoal grill is especially tasty, and this fact accounts for the great popularity of outdoor cooking devices. One major negative aspect of known methods of charcoal cooking is the handling of consumed, or partially consumed, charcoal briquets, after the cooking is completed. It is difficult to extinguish, remove, and discard the charcoal briquets, without leaving considerable dirt, both on the area of use, and on the persons doing the cleaning.

When the charcoal grill is used in a public park or similar environment, the charcoal briquets are commonly dumped onto the ground and left there. This practice is undesirable and potentially hazardous. If the charcoal briquets are still burning, they may transmit heat, through underground roots, causing forest fires at relatively distant locations. Even if the users take reasonable care to inspect the consumed briquets, it is often possible that a briquet which is believed to have been extinguished is in fact still burning. And, at the very least, even if there is no forest fire, the partially or completely burned charcoal is harmful to the environment, since it increases the amount of dust in the air, and detracts from the appearance of public parks.

If the cooking is done in the back yard of a home, it is equally undesirable and unhealthful to leave a pile of charcoal briquets on the ground. In addition to the environmental hazard and the negative aesthetic effect, the practice also poses a health hazard to children and pets who inevitably touch and eat almost anything within view.

Various means of extinguishing charcoal fires have been known in the prior art. For example, U.S. Pat. No. 3,060,919 shows a charcoal quench device for broilers. The device includes a basket made of wire mesh which rests within the bowl of the grill. When the grilling is completed, the top of the grill is removed, and the wire basket is lifted out of the bowl and immersed in water. In the cited patent, the wire basket is relatively rigid, maintaining its original shape throughout the cooking cycle. Also, the wire basket is kept within the broiler during cooking, so the wire needs to be quite thick.

U.S. Pat. No. 3,575,156 shows a barbecue apparatus having a disposable wire mesh basket. The apparatus is intended to be used only once. The charcoal and kindling material are provided inside the basket, and the entire apparatus is discarded after use.

U.S. Pat. No. 3,318,300 discloses another apparatus for extinguishing charcoal fires. A container holding the charcoal briquets is inverted, and the charcoal pieces are immersed in sand. U.S. Pat. No. 3,610,225 shows a barbecue unit wherein the charcoal briquets are extinguished, while still within the unit, due to lack of oxygen.

Other examples of prior art dealing with barbecue cooking apparatus include U.S. Pat. Nos. 3,370,582, 3,394,693, 3,509,814, and 4,254,863.

The present invention discloses a novel apparatus and method for extinguishing charcoal fires. The present method provides a simple, safe, economical, and clean way of extinguishing the fires, and of disposing of the charcoal residues. By use of this invention, it is possible to extinguish the fire and dispose of the charcoal, without ever touching the charcoal.

SUMMARY OF THE INVENTION

The present invention comprises a kit and a method for extinguishing charcoal fires. In its simplest embodiment, the kit comprises a flexible metal net and a bag capable of holding water. The metal net is constructed of wire or cable having a thickness sufficient to hold a plurality of burning charcoal briquets. The mesh size of the net is sufficiently small to hold briquet-sized objects. The net has at least two, and preferably four, handles disposed at its periphery. The handles may be made of the same wire or cable used to construct the net, or may be of a different material. The bag is made of a material which is water resistant, such as plastic, and is sufficiently large to accommodate a load of briquets, and sufficiently thick to hold boiling water without melting or breaking.

The kit may also include a basket or other container for supporting the bag. Alternatively, the kit can be packaged without the basket, with the understanding that the user must supply some independent support means.

In extinguishing a charcoal fire according to the method of the present invention, the metal net is laid on the ground. The bag is at least partially filled with water, and is supported in an upright position. The charcoal briquets are then dumped onto the net. The net is then picked up by its handles, and the briquets are immersed in the water in the bag, while still being held within the net. After the briquets have been completely extinguished, one or more of the handles of the net are released, and the briquets are allowed to fall into the water. The bag is then tied, and may be easily discarded. The net can be reused, in conjunction with another bag.

It is therefore an object of the present invention to provide a kit for extinguishing charcoal fires.

It is another object of the invention to provide a kit as described above, wherein the kit may be used more than once.

It is another object of the invention to provide a kit as described above, wherein use of the kit permits the extinguishing of charcoal fires without touching the charcoal, and without defiling the environment.

It is another object of the invention to provide a kit as described above, wherein the consumed charcoal may be easily discarded.

It is another object of the invention to provide a method of extinguishing a charcoal fire.

It is another object of the invention to provide a method as described above, wherein the method may be used in conjunction with existing trash receptacles.

Other objects and advantages of the invention will be apparent to those skilled in the art, from a reading of the following brief description of the drawings, the detailed description of the invention, and the appended claims.

DETAILED DESCRIPTION OF THE INVENTION

The present invention comprises a kit for extinguishing charcoal fires, and a method of extinguishing such fires. The two essential elements of the kit are a flexible metal net, and a bag or other container for storing water. The kit may also include support means for holding the bag in an upright position.

Figure 1:
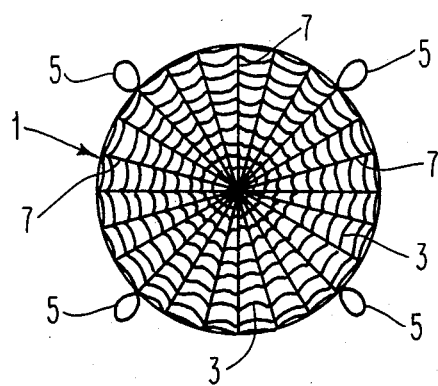
FIG. 1 is a top view of the flexible metal net used in the kit of the present invention.

FIG. 1 is a top view of the metal net constructed according to the invention. Metal net 1 is of generally circular shape, and comprises a plurality of metal elements 3 connected to spokes 7. Elements 3 and spokes 7 are of sufficient thickness to enable the net to hold a pile of burning charcoal briquets, but not so thick as to impair the flexibility of the net. It is an important feature of the present invention that the net remain flexible. The elements and spokes may be of the same thickness or of different thicknesses, as long as both thicknesses meet the criteria discussed above. The net may be about 24 inches in diameter, but this size is not critical, and many other sizes could be used, with excellent results. The optimum size of the net clearly depends on the size of the charcoal fire, and the number of briquets to be extinguished at once.

The metal net may be constructed of single strands of wire, or may be made of cable, i.e. several strands of wire wrapped around each other. It is understood that the drawing of FIG. 1 represents both alternative constructions.

Handles 5 are located along the periphery of the net. In the preferred embodiment, there are four such handles. The number of handles can also be varied, but there should be at least two of them, for best results. The handles 5 may be also constructed of wire or cable, of the same or heavier gauge as that of elements 3 and spokes 7, but may also be constructed of materials different from that of the elements and spokes.

It is understood that the particular shape of the net is not critical. The net can also be constructed in the shape of a square. The square could have a side of 24 inches, but this size may also be varied. If the net is of square shape, the interior of the net may still be constructed with the spokes and elements pattern, similar to that shown in FIG. 1. Or, the net could be formed from a rectangular arrangement of wires or cables. In addition, the net can be constructed in the shape of other polygons, regular or irregular, within the scope of the invention. What is important is that the net be flexible, and that it be strong enough to pick up and hold a plurality of burning charcoal briquets.

The remaining items of the kit of the present invention are best described by explaining the use of the invention. FIGS. 2A through 2G illustrate the means by which the invention is practiced.

Figure 2A:
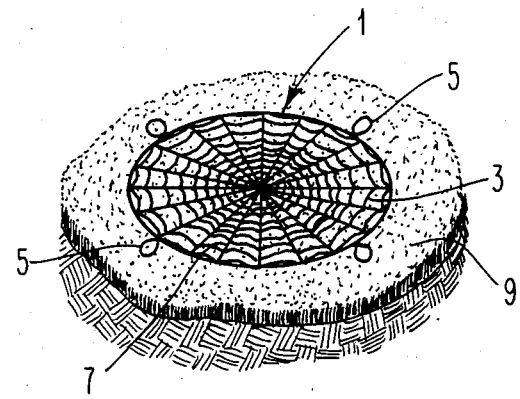
FIG. 2A is a perspective view of the metal net, after it has been laid on the ground.
Figure 2B:
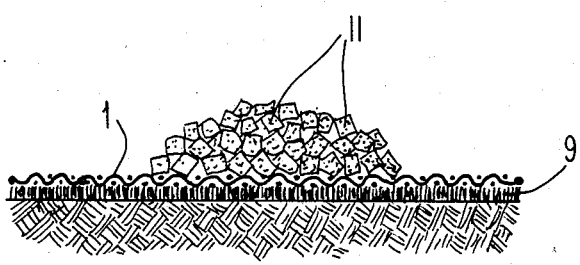
FIG. 2B is a side view showing a pile of charcoal briquets resting on the metal net.

When a charcoal fire is to be extinguished, the metal net 1 is laid on the ground 9, as illustrated in FIG. 2A. In practice, it is desirable to moisten the ground area before laying the net in place. Next, charcoal briquets 11 from a conventional barbecue apparatus (not shown) are dumped onto net 1, as illustrated in FIG. 2B.

Figure 2C:
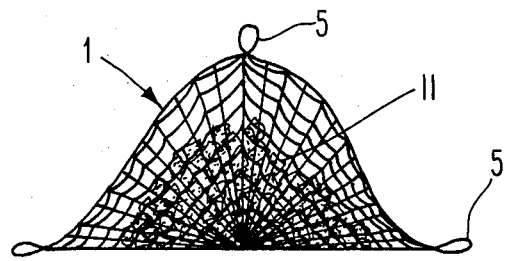
FIG. 2C is a side view illustrating the first step in lifting the net with the charcoal briquets.

With the briquets 11 lying on the net 1, the ends of the net are lifted so as to enclosed the briquets, as illustrated in FIG. 2C. In FIG. 2C, it is assumed that there are four handles 5, and that two opposite handles have been lifted at one time. Then the remaining two opposite handles 5 are similarly lifted. As stated above, the the number of handles could be different, within the scope of the invention, but it is preferable to have sufficient handles to enable one to be able to grasp opposing handles in picking up the briquets.

Figure 2D:
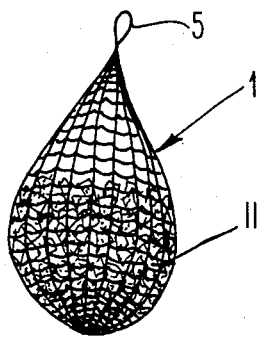
FIG. 2D is a view showing the charcoal briquets contained within the net, the net having been lifted from the ground.

The result of the lifting of the net is shown in FIG. 2D. FIG. 2D shows the charcoal briquets 11 completely enclosed within the net 1. Handles 5 are shown as one handle, reflecting the fact that the handles, when grasped, tend to coincide, and would be seen as one handle.

Figure 2E:
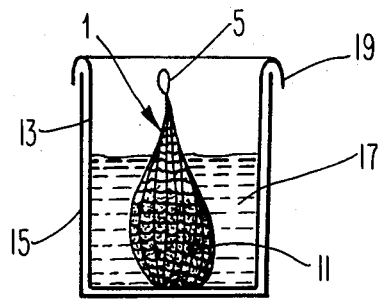
FIG. 2E is an elevational view showing the net, with the charcoal briquets inside, being immersed in water in a bag.

Meanwhile, as shown in FIG. 2E, a bag 13 has been provided, the bag being substantially impervious to water. Bag 13 can be made of heavy gauge plastic, or other flexible material. The material for the bag should be of sufficient strength to enable the bag to hold boiling water without melting, tearing, or disintegrating. The shape of the bag can be similar to that of bags commonly used to dispose of trash. The bag might be about 24 inches high, with a width of about 8 inches and a length of about 12 inches. These dimensions, however, are only examples, and are not to be deemed at all critical. The choice of dimensions is governed mainly by the condition that the bag be large enough to accommodate the net and briquets therein. It is also possible to form the bag of a circular, instead of a rectangular, cross section.

Bag 13 is disposed in container 15, and is arranged so that its end 19 hangs over the rim of the container. The bag has been partially filled with water 17. The type of construction of container 15 is not critical, as long as it provides a means for supporting the bag in an upright position when the bag is filled.

As shown in FIG. 2E, the net 1 is then substantially submerged in water 17 in bag 13. The charcoal briquets 11 are thus extinguished completely in a few moments. The extinguishing process heats the water, and may even cause the water to boil. But since the bag is made of heavy gauge material, it can withstand the temperature increase without melting or breaking.

Figure 2G:
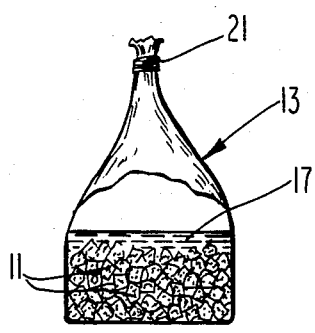
FIG. 2G is a partly cut-away view showing the briquets and water within the bag, the bag having been secured at its end.
Figure 2F:
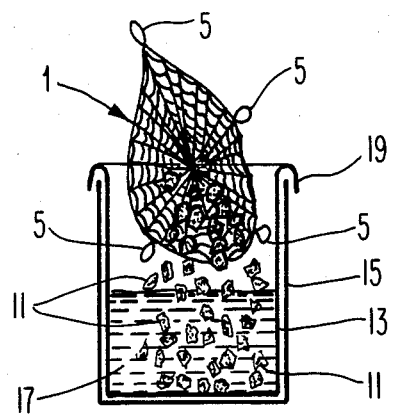
FIG. 2F is an elevational view showing the charcoal briquets being released from the net and into the water in the bag.

After the fire is quenched, several of the handles 5 of net 1 are released, as shown in FIG. 2F. One handle is still held, so that the charcoal briquets 11 are allowed to fall into the water 17 in bag 13, while the net is lifted out of the bag.

Finally, as illustrated in the cutaway view of FIG. 2G, the open end of bag 13 is tied with cord 21, or other suitable means for securing the end of the bag. Briquets 11, as well as water 17, remain in the bag. The entire bag can then be carried to the nearest trash receptacle.

It is to be appreciated that, throughout the method described herein, there is no need to touch the charcoal directly. The charcoal briquets are removed with a minimum of effort, and with virtually no adverse effects on the environment.

The kit of the invention may be packaged with or without the container in which the bag is to be supported. With the container included, the kit can be used at any location where water is available. However, the container may add undesired bulk to the kit. The container can be omitted from the kit, as long as the user assumes the responsibility of finding a suitable container, such as a trash can in a public park. It is understood that it is the bag which holds the water, and it is the container which supports the bag. At no time is water poured directly into a trash can or other container.

The present invention thus provides a very economical and simple way of extinguishing charcoal fires. The cost of the net and bag is not great, and the kit can be used by almost anyone. The net can be used several times, although, of course, a new bag must be used for each charcoal fire. The kit may also be conveniently stored. The net, being flexible, can be folded, together with the bags.

It is apparent that the objects of the invention are fulfilled by the above disclosure. It is understood, however, that the invention may be modified in many ways. As described above, the particular shape of the metal net, the number and configuration of its handles, and the type of bag and container used can all be varied considerably. Also, while the invention has been described with reference to charcoal briquets, it is understood that the invention can be used with other, similarly-sized components, which may not be true charcoal. The term "charcoal briquets" as used herein is therefore not intended to limit the scope of the invention. These and other modifications are to be deemed within the spirit and scope of the following claims.

What is claimed is:

1. A kit for extinguishing charcoal fires, the kit comprising:
    (a) a flexible metal net, the net having a strength and mesh size sufficient to hold hot charcoal briquets, the net having at least two handles disposed along its periphery, the net being capable of being laid flat on the ground, the net being substantially free of any rigidifying members,
    (b) a bag, the bag being water resistant, the bag being sufficiently large such that the net, when filled with charcoal briquets, can be inserted into the bag without touching the walls of the bag, the bag being of sufficient strength to hold both the briquets and a quantity of water sufficient to extinguish the briquets, the bag being sufficiently strong to hold boiling water without melting or tearing, and
    (c) means for closing off the end of the bag.

2. The kit of claim 1, further comprising means for supporting the bag in an upright position, whereby water can be stored in the bag.

3. The kit of claim 2, wherein the net has four handles.

4. A method of extinguishing a plurality of charcoal briquets and the like, comprising the steps of:
    (a) laying a flexible metal net having at least two peripheral handles, in a substantially flat position, on the ground,
    (b) dumping the charcoal briquets onto the net,
    (c) pulling the net up by its handles so as to enclose substantially the charcoal briquets therein,
    (d) immersing at least part of the net in a container of water in such a manner that the net does not touch any part of the container, and such that the briquets are immersed in the water,
    (e) allowing the briquets to spill out of the net and into the container, and
    (f) closing off the end of the container while the briquets and the water remain therein.

5. The method of claim 4, wherein the container comprises a substantially water resistant bag disposed within a support means.

6. The method of claim 4, wherein the net comprises four handles disposed along its periphery, and wherein the pulling step comprises the steps of gathering two opposing handles of the net and lifting the handles together, and gathering the remaining handles of the net and lifting the remaining handles together with the first handles.

* * * * *